United States Patent [19]

Heinola

[11] 4,228,849

[45] Oct. 21, 1980

[54] APPARATUS FOR CONTROLLING RELATIVE GAS FLOW RATES THROUGH DUCTS

[75] Inventor: Reino Heinola, Kaarina, Finland

[73] Assignee: Valmet Oy, Finland

[21] Appl. No.: 929,951

[22] Filed: Aug. 1, 1978

[30] Foreign Application Priority Data

Aug. 12, 1977 [FI] Finland .................................. 772437

[51] Int. Cl.$^3$ .............................................. B60H 1/00
[52] U.S. Cl. ........................................ 165/39; 165/16; 165/DIG. 12; 98/33 R; 137/98; 137/100
[58] Field of Search ................... 165/DIG. 12, 16, 39; 98/33 R; 137/98, 100

[56] References Cited

U.S. PATENT DOCUMENTS

| | | | |
|---|---|---|---|
| 1,558,529 | 10/1925 | Wünsch | 137/100 |
| 2,418,388 | 4/1947 | Ziebolz | 137/98 |
| 3,103,228 | 9/1963 | Davenport | 137/98 |
| 4,109,705 | 8/1978 | Bergdahl | 165/DIG. 12 |

*Primary Examiner*—Albert W. Davis
*Assistant Examiner*—Margaret A. Focarino
*Attorney, Agent, or Firm*—Steinberg & Blake

[57] ABSTRACT

Apparatus for controlling the relative rates of flow of gases through a pair of ducts including a bellows chamber defining a substantially enclosed interior and a partition member movably mounted within the chamber dividing the interior thereof into first and second partial volumes which are fluidly sealed from each other. The first partial volume is in fluid communication with a first duct in which a gas flows while the second partial volume is in fluid communication with a second duct in which a gas flows such that a change in the rate of flow of a gas through one of the ducts changes the pressure in the associated partial volume whereby the partition member will move to accommodate the same. A linkage is associated with the partition member for transmitting the movement thereof to a damper located in one of the ducts such that the gas flow opening provided by the damper in the duct is regulated by the extent of movement of the partition member. The flow rate controlling apparatus may be associated with the exhaust and intake air ducts of a ventilating system which communicates with a heat recovery unit so that the flow rates of the exhaust and intake air are controlled in a manner to prevent freezing of the condensate formed within the heat recovery unit.

4 Claims, 1 Drawing Figure

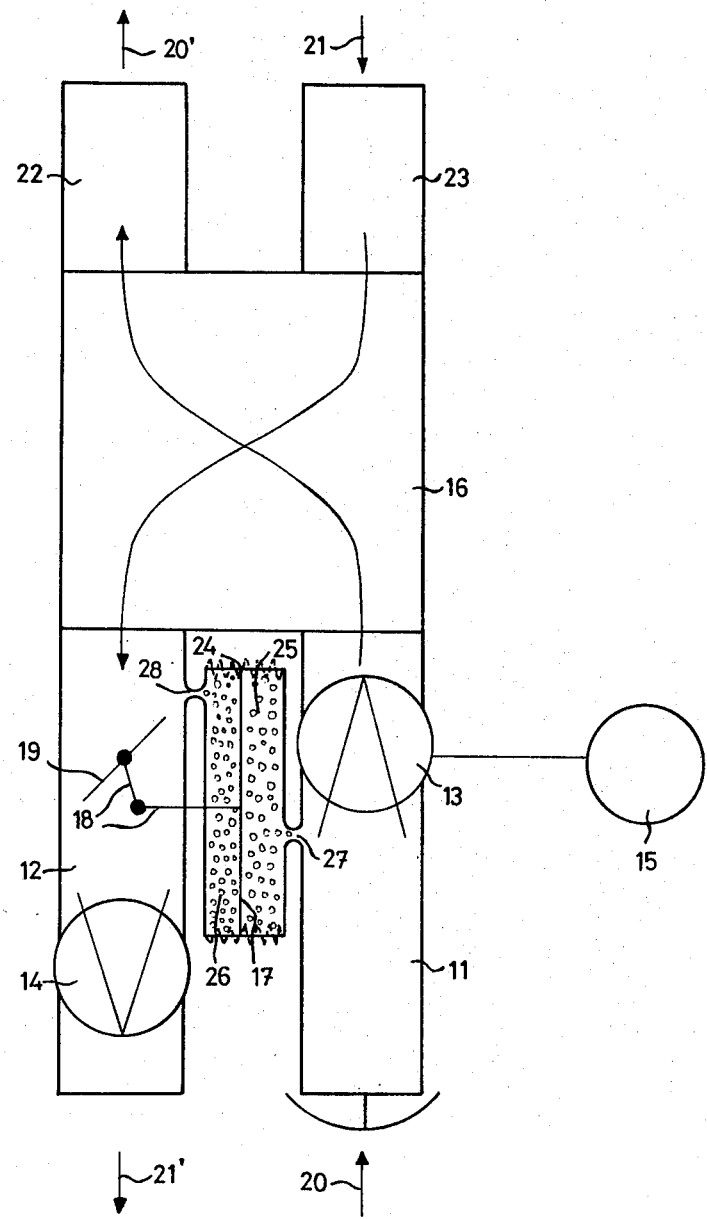

APPARATUS FOR CONTROLLING RELATIVE GAS FLOW RATES THROUGH DUCTS

BACKGROUND OF THE INVENTION

This invention relates generally to gas flow control apparatus and, more particularly, to apparatus for controlling the relative rates of flow of gases through ducts. It is not uncommon in gas flow systems to require the maintenance of a particular value for the relative rates of flow of gases through ducts. For example, in ventilation systems, there is often a need to maintain a desired relationship between the rates of flow of exhaust air and intake air. For example, where a change in the flow rate of outgoing exhaust air occurs, it is desirable and often necessary to accordingly regulate the rate of flow of the intake air.

In this connection, where the intake and exhaust air supplies in a ventilation system are used in conjunction with a heat recovery unit, it is important to maintain the relative rates of flow of the air through the intake and exhaust ducts. More particularly, such heat recovery units typically include a housing divided into intake and exhaust portions by a thermal transfer sheet whereby exhaust air transmitted through one portion will transfer heat through the thermal transfer surface to the incoming intake air directed through the intake portion of the unit. It is not unusual for condensate to form in such heat recovery units which often freezes in cold weather thereby affecting the relative flow rates in the exhaust and intake ducts in such cases, as discussed below it is desirable to provide an apparatus for maintaining the relative flow rates of the desired level.

SUMMARY OF THE INVENTION

Accordingly, one object of the present invention is to provide a new and improved apparatus for controlling the relative rates of flow of gases through ducts.

Another object of the present invention is to provide such control apparatus which when utilized in connection with ventilation systems fitted with heat recovery units prevents freezing of the condensate formed within the heat recovery unit.

Yet another object of the present invention is to provide apparatus for controlling the relative rates of flow of gases through ducts which are simple in construction and economical in manufacture.

Briefly, in accordance with the present invention, these and other objects are attained by providing apparatus including a chamber defining a substantially enclosed interior having a partition member movably mounted therewithin dividing the chamber interior into first and second partial volumes which are fluidly sealed with respect to each other. Means are provided for fluidly intercommunicating the first partial volume with a first duct in which a gas flows and the second partial volume with the second duct in which gas flows. A linkage means intercommunicates the partition member with a damper located in one of the gas flow ducts for transmitting the movement of the partition member in a manner to regulate the extent of opening of the damper within the duct. In a preferred embodiment, the chamber comprises a bellows structure.

DESCRIPTION OF THE DRAWINGS

A more complete appreciation of the invention and many of the attendant advantages thereof will be readily appreciated as the same become better understood by reference to the following detailed description when considered in connection with the accompanying drawing in which the FIGURE is a schematic illustration of the apparatus of the present invention operatively associated with a pair of gas flow ducts which communicate with a heat recovery unit in a ventilation system.

DESCRIPTION OF THE PREFERRED EMBODIMENT

Referring now to the drawing, the apparatus of the present invention is shown as incorporated in a ventilation system comprising an air flow exhaust duct 11 and an air flow intake duct 12, ducts 11 and 12 fluidly communicating with a heat recovery unit 16, which in the present embodiment comprises a conventional counterflow heat recovery unit wherein thermal energy is transferred across a thermal transfer plate contained theewithin (not shown). However, it is understood that any conventional heat recovery unit may be used in connection with the present invention. In this respect, it is further understood that the apparatus of the present invention need not necessarily be employed in conjunction with a heat recovery unit as shown but may be used in connection solely with a pair of gas flow ducts. In any event, the exhaust air flow, designated 20, which flows through exhaust duct 11 passes through heat recovery unit 16 and exits to the atmosphere as air flow 20' through air flow duct 22. Similarly, intake air flow, designated 21, which may comprise fresh, outdoor air, enters heat recovery unit 16 through air flow duct 23 and passes into the air flow intake duct 12, exiting therefrom as air flow 21'. It is understood by those skilled in the art that the fresh, outdoor air 21 will recover a portion of the thermal energy contained in the exiting exhaust air 20 in heat recovery unit 16. Thus, the intake air exiting from intake duct 12 has been heated and it is readily apparent that the system illustrated may be advantageously employed in the ventilation system of an enclosed space, such as a factory or room.

Air flow ducts 11 and 12 are provided with blowers 13 and 14, respectively which control the rate of flow of the intake and exhaust air. Control apparatus 15 is provided for selectively varying the flow rate provided by blower 13.

It is understood that all of the above described structure, namely the heat recovery unit 16 and the various intake and exhaust ducts 11, 12, 22 and 23, as well as the provision of blowers 13 and 14 are conventional.

The flow rate controlling apparatus of the present invention comprises a substantially closed chamber 24 having a partition member 17 movably disposed therewithin which divides the interior of the chamber into first and second partial volumes 25,26. The first and second partial volumes 25,26 are fluidly sealed from each other by the partition member 17.

In a preferred embodiment, chamber 24 comprises a bellows member whose side wall surfaces are formed of accordian shaped fabric material whereas the end walls are formed of sheet metal. Partition member 17 may comprise a sheet metal member whose edges are secured to the interior surfaces of the bellows side walls. This particular structure of chamber 24 is illustrated in phantom lines in the FIGURE.

A damper 19 is pivotally located within the air flow intake duct 12. A linkage operatively interconnects damper 19 and partition member 17 in a manner which will be readily understood by those skilled in the art so that upon movement of partition member 17 as described below, damper 19 will be suitably rotated. Of course, the end wall of chamber 24 is provided with a suitable packing so that the second partial volume 26 remains substantially closed.

Conduits 27 and 28 fluidly intercommunicate first partial volume 25 and exhaust duct 11 and second partial volume 26 and intake duct 12, respectively. Thus, the first and second partial volumes with be subjected to the same internal pressure as exists in the respective ducts with which they communicate.

The operation of the control apparatus of the present invention in conjunction with the particular ventilation system shown will now be described. Essentially, upon the blower 13 being adjusted by control means 15 to regulate the rate of exhaust air flow 20, the control apparatus of the present invention will function to automatically change the intake air flow 21 in a manner such that the relative rates of air flow 20 and 21 remains at a desired volume. Thus, for example, upon the rate of the exhaust air flow 20 being increased, the pressure drop in the exhaust air duct 11 will increase. This will result in a like increase in the pressure drop within first partial volume 25 thereby resulting in the movement of partition member 17 to the right as seen in the FIGURE. The rightward movement of partition 17 is transmitted to the damper 19 through linkage 18 causing damper 19 to open to a wider extent in the intake air duct 12 thereby increasing the intake air flow 21. Of course, the pressure drop will thereby increase in the air duct 12 and the damper 19 will assume a stable position when both pressures in the partial volumes are equal.

It is seen that it is possible with the aid of the control apparatus of the invention to maintain the relative rates of flow at a predetermined level when the magnitude of one of the rates of air flow changes. For example, if the air flow ducts 11 and 12 are assumed to have equal resistance, the air flows 20 and 21 will normally be equal in magnitude. In such a case, the control apparatus of the invention will maintain the air flows 20 and 21 equal at all times even when one of the air flow rates change in magnitude. In other words, the control apparatus of the present invention actually comprises an equilibrium member which tends to equalize the pressure drops in the flow duct systems which thereby results in the controlling of the relative rates of air flow to a desired value. It is seen that the control apparatus will maintain the desired relative flow rates regardless of which duct has it flow rate regulated, the sole condition being that there exists sufficient pressure on the delivery side of the intake air blower 14.

The apparatus of the present invention results in marked advantages when used in connection with ventilation systems equipped with heat recovery as shown in the FIGURE. Thus, it is will known that when high efficiency in heat recovery is attempted, there is always a problem of condensate formation in the exhaust air flow by virtue of its being cooled, with subsequent freezing of the condensate within the heat recovery unit. Thus, when the exhaust blower is located prior to the heat recovery unit, a reduction of the air flow and a lowering of the pressure drop results from condensate freezing. Should this occur in a ventilation system equipped with the present invention, the control apparatus will operate to reduce the intake air flow 21 so that additional freezing of the heat recovery unit 16 is prevented. Since the components of the apparatus comprising the ventilation system are usually accommodated in the interior room space at room temperature, the heat recovery unit 16 will gradually thaw as a result of thermal conduction and normal friction losses.

The control apparatus of the present invention can be mounted at the entrance port of the suction chamber and constitutes both an inspection, and a protection for the blower.

Obviously, numerous modification and variations of the present invention are possible in the light of the above teachings. It is therefore to be understood that within the scope of the appended claims the invention may be practiced otherwise than as specifically described herein.

What is claimed is:

1. Apparatus for controlling the relative rates of flow of gases through a pair of ducts comprising:
   a chamber defining a substantially enclosed interior; a partition member movably mounted within said chamber dividing the interior thereof into first and second partial volumes fluidly sealed with respect to each other;
   first means for providing fluid communication with said first partial volume adapted to provide fluid communication between said first partial volume and a first duct in which a gas flows;
   second means for providing fluid communication with said second partial volume adapted to provide fluid communication between said second partial volume and a second duct in which a gas flows; and
   means associated with said partition member for transmitting the movement thereof exteriorly of said chamber adapted to control the extent of an opening of a damper located within one of said first and second ducts.

2. Apparatus as recited in claim 1 wherein said chamber comprises a bellows assembly wherein the chamber side walls comprise fabric folded in an accordian like configuration and the chamber end walls comprise a pair of sheet metal plates.

3. Apparatus as recited in claim 1, said first fluid communication means providing fluid communication between said first duct and said first partial volume and said second fluid communication means providing fluid communication between said second duct and said second partial volume, said damper being located in said second duct and wherein said first duct comprises an exhaust duct and said second duct comprises an air intake duct of a ventilating system.

4. Apparatus as recited in claim 3 further including a heat recovery unit wherein said first and second ducts communicate with said heat recovery unit, whereby by controlling the relative rates of air flow through said first and second ducts, freezing of any condensate within the heat recovery unit is substantially eliminated.

* * * * *